United States Patent [19]

Akiyama

[11] Patent Number: 5,251,042
[45] Date of Patent: Oct. 5, 1993

[54] COMPONENT VIDEO SIGNAL TRANSMITTING APPARATUS

[75] Inventor: Toru Akiyama, Tokorozawa, Japan

[73] Assignee: Pioneer Electronic Corporation, Tokyo, Japan

[21] Appl. No.: 878,979

[22] Filed: May 6, 1992

[30] Foreign Application Priority Data

Sep. 20, 1991 [JP] Japan .................. 3-241960

[51] Int. Cl.$^5$ .................. H04N 9/79; H04N 11/14; H04N 9/64
[52] U.S. Cl. .................. 358/330; 358/16; 358/27; 358/35
[58] Field of Search .............. 358/16, 23, 330, 27, 358/35, 328

[56] References Cited

U.S. PATENT DOCUMENTS

| 4,677,498 | 6/1987 | Tsushima | 358/310 |
| 4,712,132 | 12/1987 | Soca | 358/27 |
| 4,723,175 | 2/1988 | Ichinori et al. | 358/27 |
| 4,754,323 | 6/1988 | Kaji et al. | 358/27 |
| 5,068,718 | 11/1991 | Iwabe et al. | 358/27 |
| 5,083,198 | 1/1992 | Haferl et al. | 358/32 |

Primary Examiner—John K. Peng
Attorney, Agent, or Firm—Fish & Richardson

[57] ABSTRACT

A component video signal transmitting apparatus for suppressing any adverse affects caused by noises which are mixed with FM signals which are transmitted after component video signals are frequency modulated. After the color difference signals in the component video signals are previously expanded in level in a high level region, they are frequency modulated and transmitted. The high level expanded color difference signals extracted by demodulation of the transmitted signals are compressed in level at the high level region.

1 Claim, 4 Drawing Sheets

INCREASING a

INCREASING b

COMPONENT VIDEO SIGNAL TRANSMITTING APPARATUS

BACKGROUND OF THE INVENTION

1. Field of the Invention

The present invention relates to a transmitting apparatus for transmitting (including recordal and reproduction) a color video signal in the form of component signals which are a luminance signal Y and two color difference signals $P_b$ and $P_r$.

2. Description of the Prior Art

In the so-called high vision system, a color video signal is divided into a luminance signal and color difference signals by the following equations (1) and transmitted as component video signals.

$$Y = 0.701G + 0.87B + 0.212R$$

$$P_b = -0.384G + 0.500B + 0.116R$$

$$P_r = -0.445G - 0.055B + 0.500R \quad (1)$$

An FM carrier is frequency modulated by the above Y signal and $P_b$ and $P_r$ signals and the resultant frequency modulated wave (FM wave) is transmitted. In such a transmitting process, various noises are mixed with the FM wave and corresponding noises appear in demodulated Y and $P_b$ and $P_r$ signals after the transmission, which causes deterioration of the resultant color image.

For instance, a case where the above FM signals are recorded onto an optical disk and reproduced will now be considered.

In the above recordal and reproduction, noises which are mixed with a read signal which is derived from an optical disk are so called random noises and there are the following kinds of noises.

(a) Noises in a head amplifier to amplify an RF signal;
(b) So-called disk noises included in an optical disk; and
(c) Optical noises contained in a laser beam used as a reading light beam.

FIG. 1 shows situations of color bar distributions with respect to the Y, $P_b$, and $P_r$ signals. In the color bar distribution diagram, hatched portions indicate noise components which appear in the transmitting system.

A state in which color noises in a color image are seen has been examined, so that the following points have been found out. That is, on the screen, the color noises are conspicuous in a portion where the luminance is slightly dark and the absolute values of the color difference signals are large (color saturations are high).

The color bars are observed in consideration of the above state in which the color noises on the screen due to the noise signal are seen. A consideration will be first made with respect to the $P_b$ signal. Since the absolute value levels are high in the portions of magenta and blue and the Y level decreases, the color noises are conspicuous in those portions. When observing with regard to the $P_r$ signal, the absolute value levels are high in the magenta and red portions and the color noises are conspicuous in those portions because of the reason similar to that in the case of the $P_b$ signal.

SUMMARY OF THE INVENTION

It is, therefore, an object of the present invention to provide a transmitting apparatus which can avoid adverse affects caused by the noises which are mixed with FM signals which are transmitted after those component video signals are frequency modulated.

According to the present invention, there is provided a component video signal transmitting apparatus for transmitting a luminance signal and color difference signals corresponding to an original color video signal, comprising: high level expanding means for expanding in level high level portions of the color difference signals and obtaining high level expanded color difference signals; transmitting means for transmitting modulation signals which are obtained by modulating the high level expanded color difference signals and the luminance signal; demodulating means for demodulating the modulation signals transmitted by the transmitting means and obtaining the high level expanded color difference signals and the luminance signal; and high level compressing means for compressing in level the high levels of the high level expanded color difference signals.

In the component video signal transmitting apparatus according to the present invention, the color difference signals are modulated in a state in which they are at the high level, namely, large amplitude portions are expanded in level and the modulated signals are transmitted and the high level portions of the color difference signals which are obtained by the demodulation after the transmission are compressed in level.

DETAILED DESCRIPTION OF A PREFERRED EMBODIMENT

An embodiment of the present invention will be described hereinbelow.

Figure 1:
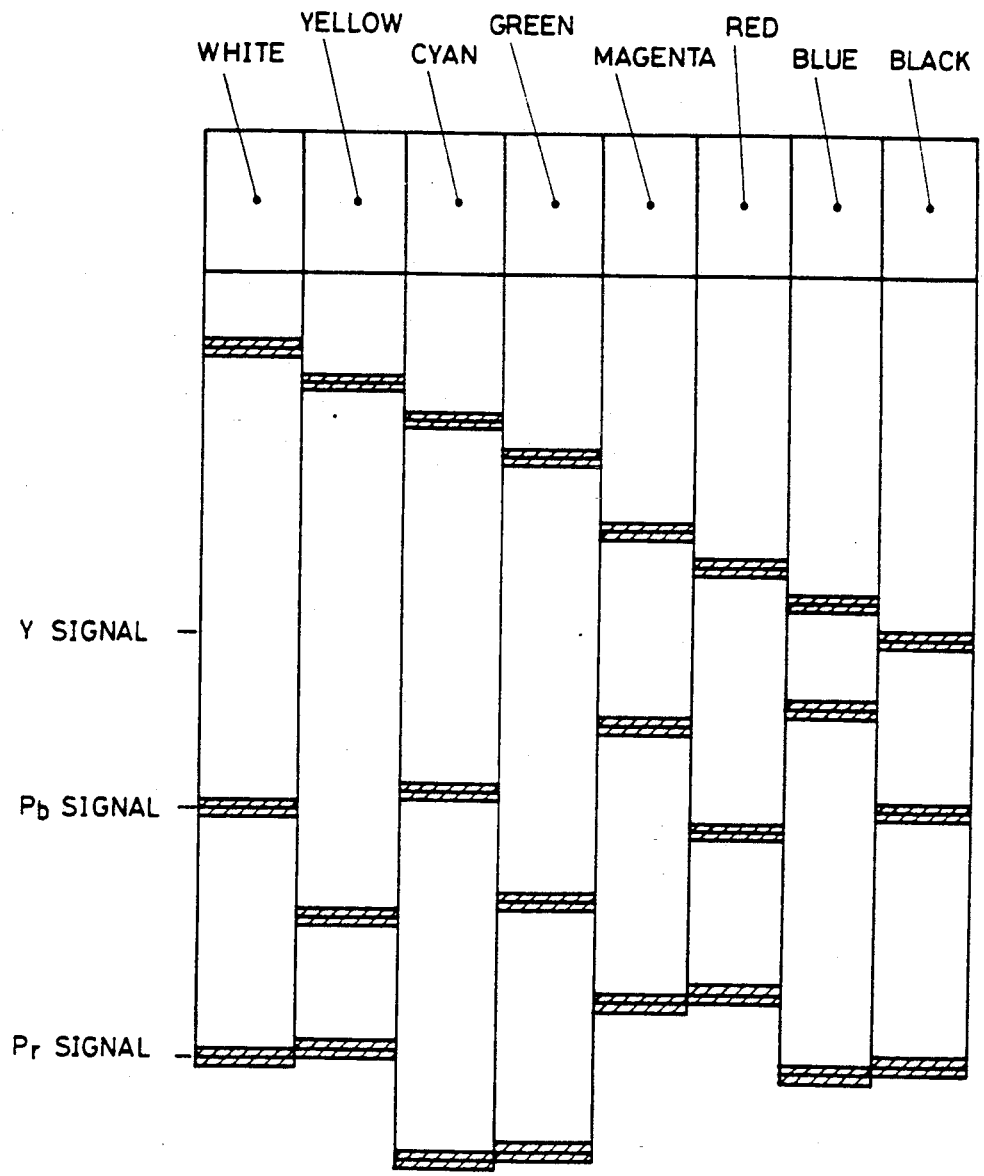
FIG. 1 is a color bar diagram showing level distributions of component video signals after transmission to the hues in the prior art.
Figure 2:
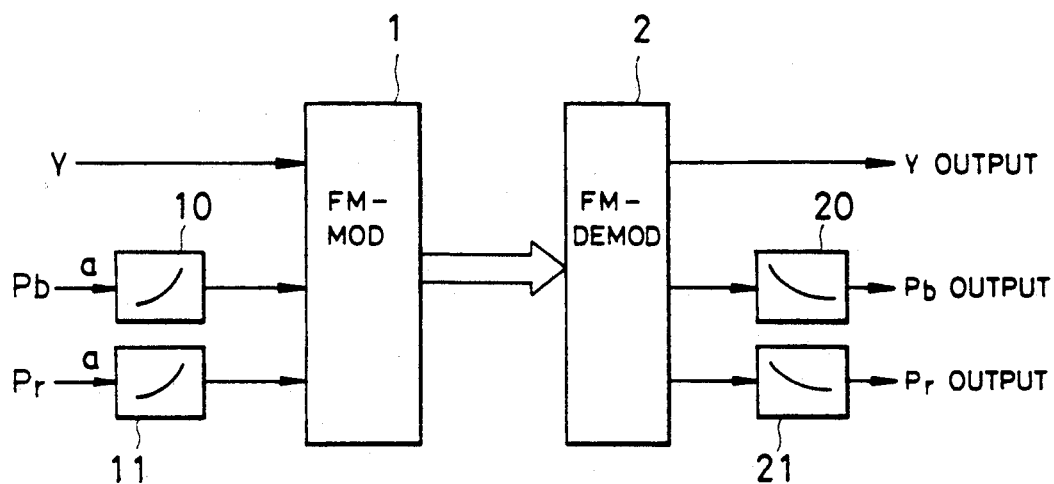
FIG. 2 is a block diagram showing a transmitting apparatus of component video signals according to the present invention.

FIG. 2 shows a component video signal transmitting apparatus according to the present invention. In the component video signal transmitting apparatus, before three component signals of the luminance signal Y and color difference signals $P_b$ and $P_r$ are modulated by a frequency modulator 1, the color difference signals $P_b$ and $P_r$ are expanded in level to the high level by non-linear circuits 10 and 11 to expand the amplitudes of the high level portions The polarities of the color difference signals $P_b$ and $P_r$ are previously inverted by inverters 10 and 11. The three FM signals obtained as mentioned above are respectively transmitted. The above transmission is not limited to the case where the three FM signals are respectively recorded onto and reproduced from three tracks but also includes a transmitting method whereby those FM signals are converted into TCI (Time Compressed Integration) signals and transmitted in a wireless manner, a transmitting method by the MUSE system, and the like. A recording medium such as optical disk, magnetic tape, or the like is considered as a recording medium in the case of the recording and reproducing operations.

The FM signals transmitted as mentioned above are demodulated by a frequency demodulator 2 and become the luminance signal Y and high level expanded color difference signals. The high level expanded color difference signals $P_b$ and $P_r$ are converted into the original color difference signals $P_b$ and $P_r$ by non-linear circuits 20 and 21 having non-linear characteristics to compress in level the high level.

Figure 3A:
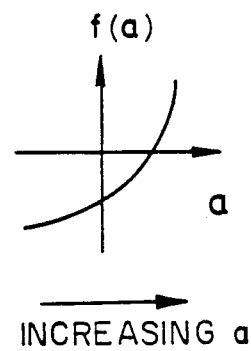
FIG. 3A is a graph showing non-linear response characteristics of a non-linear circuit on the transmission side in FIG. 2.
Figure 3B:
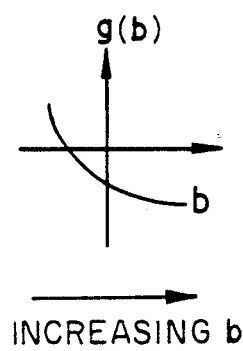
FIG. 3B is a graph showing non-linear response characteristics of a non-linear circuit on the reception side in FIG. 2.

As shown in FIG. 3A, the non-linear circuits 10 and 11 have the non-linear characteristics such that in a region where a level of input signal (a) is high, a gain f(a) is larger than that in a region of a low level and, further preferably, a gain increasing rate to an increase in level is positive. As shown in FIG. 3B, the non-linear circuits 20 and 21 have the non-linear characteristics such that in a region where a level of input signal (b) is high, a gain g(b) is smaller than that in a region of a low level and, more preferably, a gain increasing rate to an increase in level is negative. The corresponding non-linear circuits 10 and 20 and 11 and 21 are respectively complementary to each other in their responsiveness properties.

Figure 4:
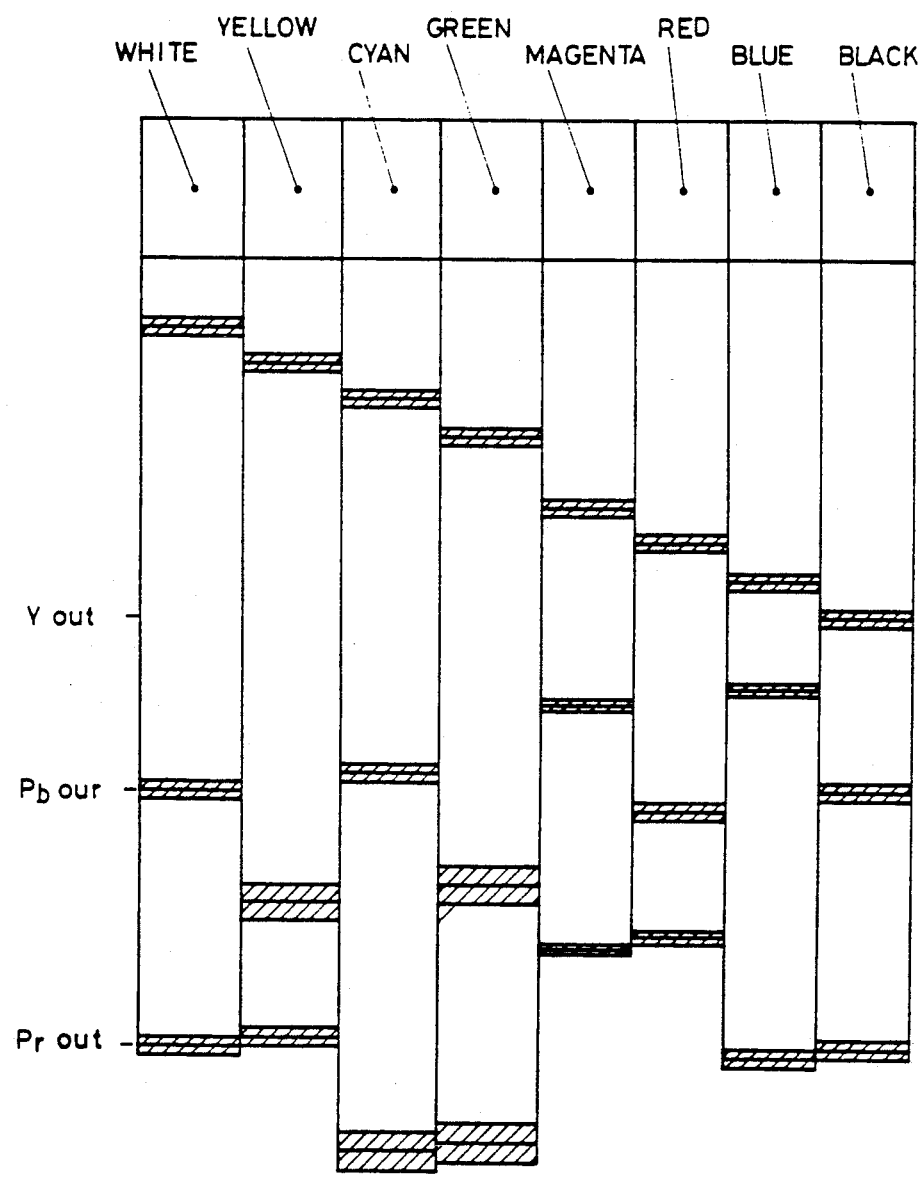
FIG. 4 is a color bar diagram showing level distributions of component video signals which are transmitted by the component video signal transmitting apparatus to the hues according to the present invention and also showing C/N ratios.
Figure 6:
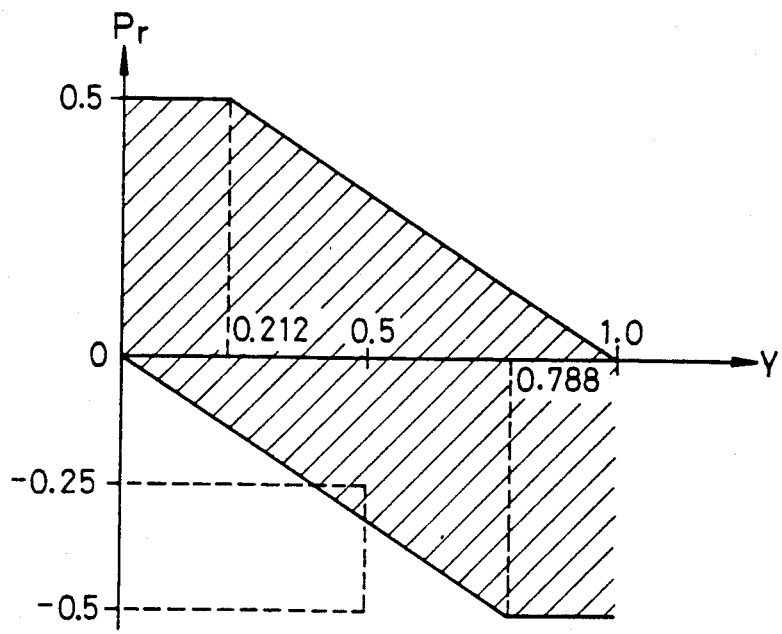

FIG. 4 is a diagram showing color bars similar to those in FIG. 6 and shows level distributions of the luminance signal Y and the color difference signals $P_b$ and $P_r$ transmitted by the transmitting apparatus of FIG. 2 in correspondence to the hues. With respect to the color difference signal $P_b$, the levels are high in the magenta and blue portions. With respect to those portions, the amplitude is expanded before transmission and the amplitude is compressed after the transmission, so that the original signals are reconstructed from the transmitted signals. With regard to the noises mixed during the transmission, the noise components are suppressed by the amplitude compressing function on the reception side. With respect to the color difference signals, the noises are suppressed by the amplitude expanding and compressing functions as for the magenta and red portions. Such a noise suppressing function is shown by a thickness of the hatched portion indicative of the noise level in the diagram.

The following equations (2) are obtained by modifying the above equations (1).

$$G = Y - 0.227P_b - 0.477P_r \qquad (2)$$
$$B = Y + 1.826P_b$$
$$R = Y + 1.576P_r$$

where, it is assumed that the respective values are determined such that $0<R<1, 0<G<1, 0<B<1, 0<Y<1$, $-0.5<P_b<0.5$, and $-0.5<P_r<0.5$.

Figure 5:
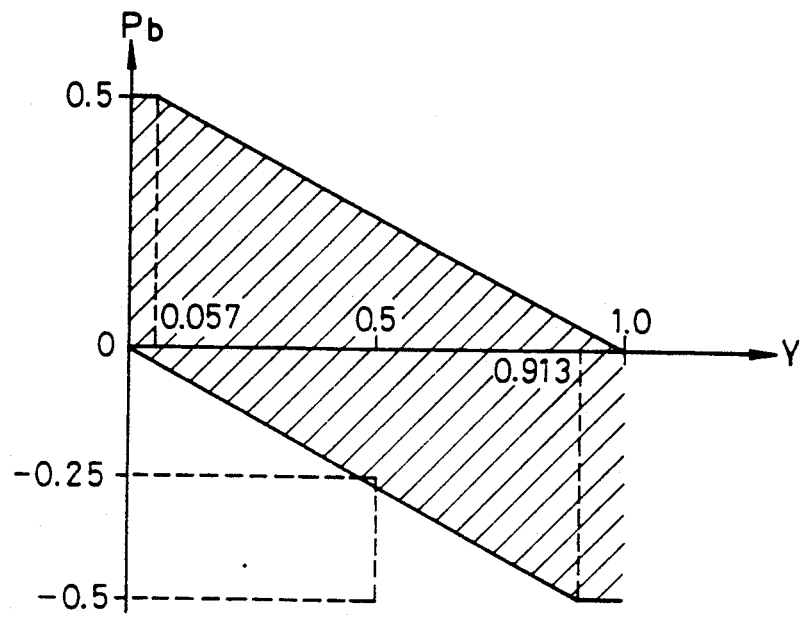
FIGS. 5 and 6 are graphs showing level changes of color difference components in the video signals to the luminance component level.

From the above equations (2), $P_b=(B-Y)/1.826$ and $P_r=(R-Y)/1.576$. Ranges of possible values of Y and $P_b$ and $P_r$ which satisfy $0<B<1$ and $0<R<1$ are shown in hatched portions in FIGS. 6 and 5. It will be also understood that in the region of $Y<0.5$, the above hatched portions hardly cross the ranges of $-0.25<P_b<0.5$ and $-0.25<P_r<0.5$.

From the above description, it will be understood that the value of $P_b$ or $P_r$ never has a negative large value in a low luminance range, in other words, the dark color of a complementary color system of blue or red can be said to be a color which is not transmitted. Since the values of the color difference signals, therefore, don't have large negative values in the low luminance range, any adverse affects can be avoid by the level inversion of the color difference signals.

As will be obviously understood from the above description, after the color difference signals in the component video signals are previously expanded in level to the high level, they are modulated and transmitted, in the component video signal transmitting apparatus according to the present invention, so that the color noises appearing in the reproduced image on the screen are seen uniformly and such a state is preferable.

What is claimed is:

1. A component video signal transmitting apparatus for transmitting a luminance signal and color difference signals corresponding to an original color video signal, comprising:

high level expanding means for expanding in level the color difference signals in a high level region and obtaining high level expanded color difference signals;

transmitting means for transmitting signals which are obtained by modulating the high level expanded color difference signals and the luminance signal;

demodulating means for demodulating the signals transmitted by the transmitting means and obtaining the high level expanded color difference signals and the luminance signal; and high level compressing means for compressing in level the high level expanded color difference signals in said high level region.

* * * * *